H. DECK.
LAWN MOWER.
APPLICATION FILED JULY 7, 1908.
937,143.
Patented Oct. 19, 1909.
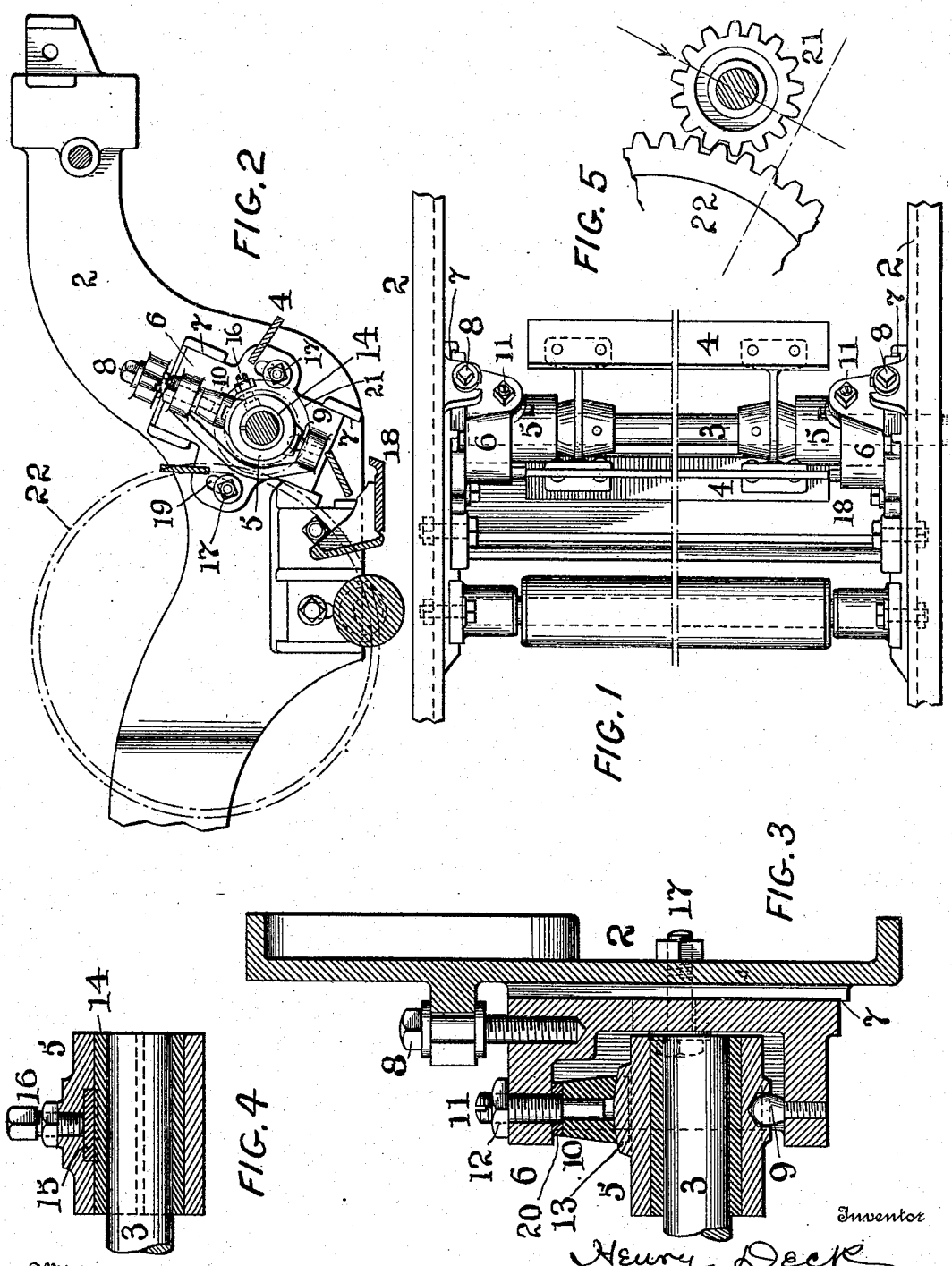

UNITED STATES PATENT OFFICE.

HENRY DECK, OF PHILADELPHIA, PENNSYLVANIA, ASSIGNOR TO JOHN F. BRAUN AND WILLIAM P. M. BRAUN, COPARTNERS, TRADING AS JOHN BRAUN & SONS, OF PHILADELPHIA, PENNSYLVANIA.

LAWN-MOWER.

937,143.  Specification of Letters Patent.  Patented Oct. 19, 1909.

Application filed July 7, 1908.  Serial No. 442,353.

*To all whom it may concern:*

Be it known that I, HENRY DECK, a citizen of the United States, and resident of the city and county of Philadelphia, State of Pennsylvania, have invented an Improvement in Lawn-Mowers, of which the following is a specification.

My invention has reference to lawn mowers and consists of certain improvements fully set forth in the following specification and shown in the accompanying drawings which form a part thereof.

The object of my invention is to provide means for adjusting the revolving cutter to and from the fixed cutter bar to permit an easy and accurate adjustment and also to support the revolving cutter in bearings which permit of universal adjustment whereby they adapt themselves to the position of the cutter shaft without binding or creating an abnormal friction.

My invention consists of the fixed cutter bar and revolving cutter, combined with adjustable bearings for the shaft of the revolving cutter comprising adjustable brackets having adjustability to or from the stationary cutter bar and supported by the main frame, and bearings for the shaft of the revolving cutter universally supported upon the brackets, whereby said brackets may be adjusted, together with the bearings, independently at each side of the machine without binding upon the cutter shaft.

My invention also consists in providing the bearings of the cutter shaft with split bushings, combined with screws for compressing the said bushings to take up wear, and an interposed hard metal shoe resting upon the bushings and receiving the thrust of the screws.

My invention further comprehends details of construction which, together with the features above specified, will be better understood by reference to the drawings in which:—

Figure 1 is a plan view of the cutting mechanism of a lawn mower embodying my invention; Fig. 2 is a sectional elevation of the same; Fig. 3 is a sectional elevation through the adjustable bearings of the cutter shaft; Fig. 4 is a sectional elevation through a portion of the bearings; and Fig. 5 is an elevation of a part of the gearing indicated in Fig. 2 in dotted lines and employed for driving the cutter shaft.

2, 2 are the side frames of a lawn mower and may be made of any suitable construction. 3 is the revolving cutter shaft and carries the cutter blades 4 which may be of any desired construction, such as heretofore employed in machines of this class. 18 is a stationary cutter bar which is fixedly secured to the main frames 2. The shaft 3 of the revolving cutter is journaled at each end in bearings 5 which are supported in brackets 6 adjustably secured to the side frames 2 of the machine. The brackets 6 are guided in guides 7 on the side frames so as to permit them to be adjustable to and from the stationary cutter 18. These brackets 6 may each be adjusted by means of an adjusting screw 8 supported in a lug extending from the main frame as clearly shown in Fig. 3. By turning this screw 8, the bracket 6 may be shifted in its guide 7 and when in proper position it may be clamped by means of bolts 17 extending through the frame 2 and slots 19 in the brackets. The bearing 5 is provided on the under side with a socket resting upon the ball shaped stud 9 and the upper part of the bearing is provided with a curved lug 13 which fits into a groove in a block 10 held in position by the end of a stud 11 which is screwed into the bracket 6 and which is locked in adjusted position by a nut 12. A spacing collar 20 may surround the stud 11 and be interposed between the bracket 6 and the block 10 as clearly shown in Fig. 3. From this construction, it will be seen that the bearing 5 may rock upon the ball shaped stud 9, and may also swivel upon said ball shaped stud and upon the stud 11 which is in alinement therewith. In this manner the bearing 5 has a universal capacity for adjustment, so as to accommodate itself to the adjusted position assumed by the bracket 6. Each end of the shaft 3 is supported by a similar bearing and bracket. It is evident that the revolving cutter may be adjusted at each end independently into proper relation with respect to the stationary cutter bar 18 to insure the rotating cutter blades 4 properly coöperating with the stationary cutter.

The bearings 5 are provided with bushings 14 which are split as indicated in Fig. 2 and by dotted lines in Fig. 4. A clamping screw 16 is employed to compress the split bushings to take up the wear and is disposed at an angle to the split part of the bushings and to the axis of oscillation of the said bearing. As the bushings 14 may be of brass or other metal softer than the bearing 5 and would therefore be crushed or worn by the adjusting screw 16, I prefer to form the bearing 5 with a recess in which is placed a shoe 15 of a hard metal, such as steel, upon which the screw directly presses and by which the pressure is transmitted to a considerable area of the bushing. This construction is more fully illustrated in Fig. 4.

The rotating shaft 3 may be driven in any suitable manner, the means for driving it being graphically illustrated by the dotted circles in Fig. 2, and also in Fig. 5 in which pinion 21 on the end of the shaft 3, meshes with the driving gear 22 which is ordinarily driven from the supporting wheels of the lawn mower. The pinion 21 so contacts with the gear 22 that as the cutters and gear teeth become worn the latter enter into closer engagement due to the angle of adjustment of the bracket 6.

While I prefer the construction shown, the details thereof may be modified without departing from the spirit of the invention.

Having now described my invention, what I claim as new and desire to secure by Letters Patent is:—

1. In a lawn mower the main frame, combined with a stationary cutter bar, a rotary cutter and shaft, brackets guided on the main frame toward and from the stationary cutter bar, adjusting means for adjusting the brackets in their guides, and bearings for the rotary cutter shaft universally journaled in the brackets.

2. In a lawn mower the main frame, combined with a stationary cutter bar, a rotary cutter and shaft, brackets guided on the main frame toward and from the stationary cutter bar, adjusting means for adjusting the brackets in their guides, means for locking the brackets to the main frame, and bearings for the rotary cutter shaft universally journaled in the brackets.

3. In a lawn mower the main frame, combined with a stationary cutter bar, a rotary cutter and shaft, brackets guided on the main frame toward and from the stationary cutter bar, adjusting means for adjusting the brackets in their guides, and bearings for the rotary cutter shaft universally journaled in the brackets having split bushings and means for adjusting the bushings.

4. In a lawn mower the main frame, combined with a stationary cutter bar, a rotary cutter and shaft, brackets guided on the main frame toward and from the stationary cutter bar, adjusting means for adjusting the brackets in their guides, and bearings for the rotary cutter shaft universally journaled in the brackets having split bushings and means for adjusting the bushings consisting of hard metal plates fitting recesses within the bearings and clamping screws pressing the plates upon the bushings.

5. In a lawn mower the main frame, combined with a stationary cutter bar, a rotary cutter and shaft, brackets guided on the main frame toward and from the stationary cutter bar, adjusting means for adjusting the brackets in their guides, bearings for the rotary cutter shaft universally journaled in the brackets, ball shaped studs upon which the bearings are supported, blocks in which the bearings are guided in a plane through the axis of the bearing, and pivotal bearings for the blocks carried by the brackets in alinement with the ball shaped studs.

6. In a lawn mower, the main frame and stationary cutter bar, combined with the rotary cutter and shaft, brackets adjustably secured to the main frame, and bearings for the rotary shaft journaled to the brackets on axes transverse to the axis of the shaft and adjustable in a plane through the axis of the shaft.

7. In a lawn mower the combination of the main frame 2 having guides, a stationary cutter bar 18, brackets 6 guided in the guides to and from the stationary cutter bar, screws 8 for adjusting the brackets on the main frames, a rotary cutter shaft 3, bearings 5 carrying the shaft 3, pivots 9 on the brackets upon which the bearings are supported, blocks 10 with which the bearings 5 form a sliding connection in the plane of the axis of the shaft, and pivot studs 11 for the blocks in line with the pivots 9.

8. In a lawn mower the combination of the main frame 2 having guides, a stationary cutter bar 18, brackets 6 guided in the guides to and from the stationary cutter bar and having slots 19, clamping screws 17 extending through the slots and main frame for locking the brackets in their adjusted positions, screws 8 for adjusting the brackets on the main frames, a rotary cutter shaft 3, bearings 5 carrying the shaft 3, pivots 9 on the brackets upon which the bearings are supported, blocks 10 with which the bearings 5 form a sliding connection in the plane of the axis of the shaft, and pivot studs 11 for the blocks in line with the pivots 9.

9. In a lawn mower the combination of a fixed cutter, a rotary cutter and its shaft, rectilinearly adjustable bearings for the rotary cutter shaft for adjusting the shaft and cutter relatively to the fixed cutter in a plane fixedly considered with reference to the fixed cutter, a pinion on the rotary cutter shaft, and a driving gear meshing with the pinion and so located relatively thereto that the teeth of the pinion more closely engage the teeth of the driving gear as the rotary cutter and its shaft are adjusted toward the fixed cutter.

10. In a lawn mower the combination of a fixed cutter, a rotary cutter and its shaft, rectilinearly adjustable bearings for the rotary cutter shaft for adjusting the shaft and cutter relatively to the fixed cutter in a plane fixedly considered with reference to the fixed cutter, a pinion on the rotary cutter shaft, a driving gear meshing with the pinion and means for causing the distance between the axis of the driving gear and the pinion to decrease as the rotary cutter and its shaft is adjusted toward the fixed cutter to insure a closer engagement of the teeth of the gear and pinion as the parts become worn and are compensated for by adjustment.

In testimony of which invention, I have hereunto set my hand.

HENRY DECK.

Witnesses:
 JESSE GILBERT,
 ALBERT E. MILLER.